United States Patent [19]
Albertson

[11] Patent Number: 4,511,119
[45] Date of Patent: Apr. 16, 1985

[54] ADJUSTABLE VALVE ASSEMBLY

[76] Inventor: Robert V. Albertson, 2100 Shadywood Rd., Wayzata, Minn. 55391

[21] Appl. No.: 402,055

[22] Filed: Jul. 26, 1982

[51] Int. Cl.[3] ............................................ F16K 31/44

[52] U.S. Cl. .................................. 251/216; 251/339; 137/866; 123/25 L

[58] Field of Search ................. 123/25 R, 25 A, 25 E, 123/25 L, 198 A, 572, 573, 574; 137/862, 866, 893; 251/216, 339

[56] References Cited

U.S. PATENT DOCUMENTS

| | | | |
|---|---|---|---|
| 341,476 | 5/1886 | Greuloch | 251/216 |
| 489,033 | 1/1893 | Proctor | 251/216 |
| 668,782 | 2/1901 | Torrance | 137/866 |
| 1,153,457 | 9/1915 | Smith | 251/216 |
| 1,660,777 | 2/1928 | Allen | 137/866 |
| 1,664,803 | 4/1928 | Agassiz | 137/893 |
| 2,795,460 | 6/1957 | Bletcher et al. | 137/893 |

*Primary Examiner*—Ira S. Lazarus
*Attorney, Agent, or Firm*—Burd, Bartz & Gutenkauf

[57] ABSTRACT

A vapor introduction system having an internal combustion engine which has an exhaust gas blow by hose connected to the intake of the engine. A fitting having a flexible hose is mounted on the cap of the windshield wiper fluid reservoir, with the hose extended to the bottom of the reservoir. A T-shaped coupling having an adjustable valve is connected with the hose to the fitting. The valve has a stem threaded into the coupling and a cone-shaped cap operable to adjust the size of the annular passage through which vapors and air flow from the windshield washer reservoir to the intake of the engine.

6 Claims, 6 Drawing Figures

Fig.3
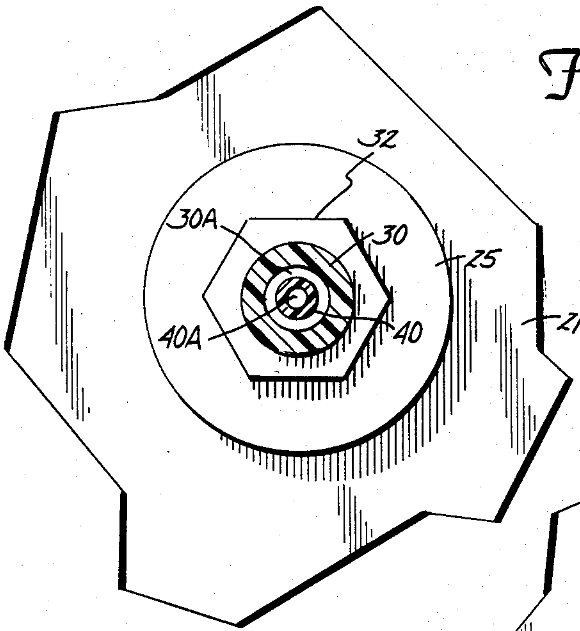
Fig.4
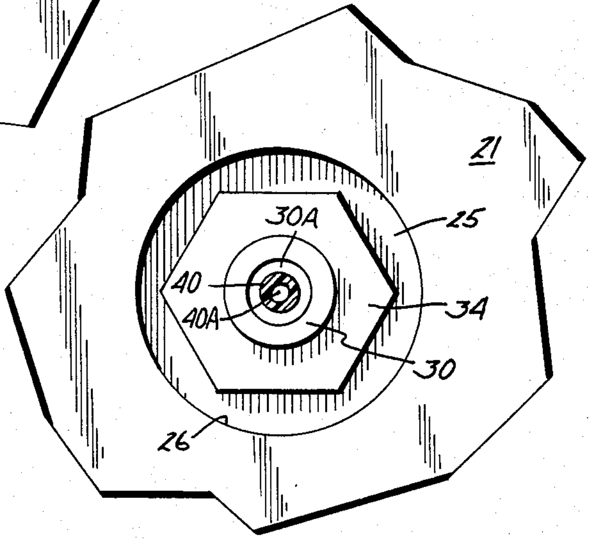
Fig.5
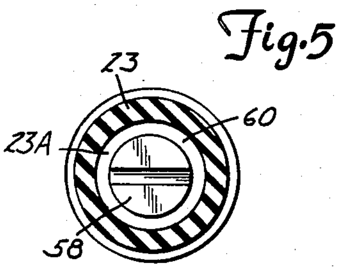
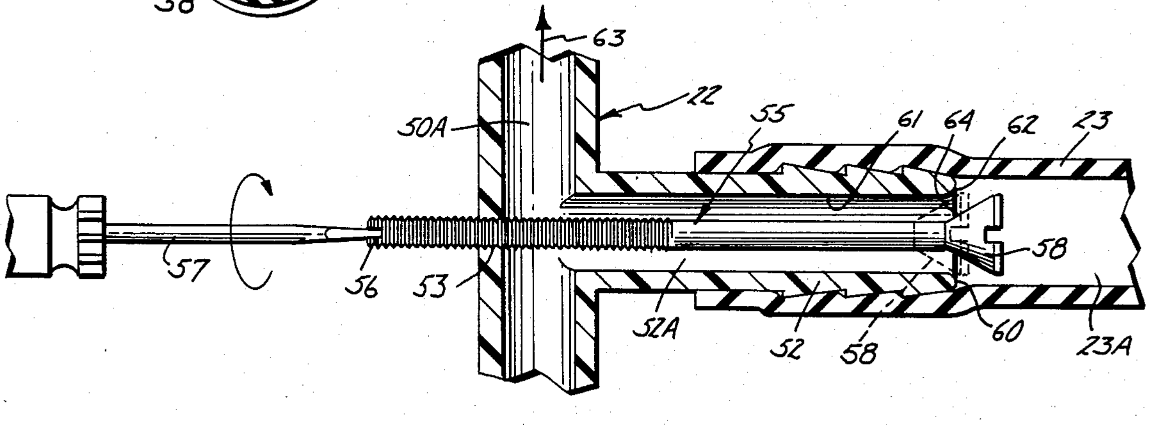
Fig.6

ADJUSTABLE VALVE ASSEMBLY

TECHNICAL FIELD

This invention relates to the field of a fuel supply for an internal combustion engine, and more particularly to a simple and economical system for adding to the intake of an internal combustion engine desired quantities of a fluid, such as a gas, water vapor, water vapor mixed with the vapor of a second liquid, such as alcohol.

BACKGROUND OF THE INVENTION

The desirability of adding vapor of water, or hydrocarbons, such as methanol, to the inlet of the internal combustion engine is well-known. By so doing the engine efficiency is increased, burning of the engine fuel is made more complete, and the presence of undesirable pollutants in the engine exhaust is greatly decreased.

SUMMARY OF THE INVENTION

The invention is related to an air and vapor generating apparatus useable with an internal combustion engine for adding air and vapor to the intake gases of the engine. The conventional internal combustion engine has a fuel intake means, such as a carburetor and an intake manifold, for accommodating a gasoline and air mixture. The automobile internal combustion engines are also equipped with a blow by gas recovery system comprising a PVC valve connected to the valve cover. A hose connects the PVC valve to the carburetor or intake manifold whereby the vacuum pressure in the intake manifold draws the blow by gases into the intake manifold of the engine. The blow by gases are not dispensed into the atmosphere. Automobiles are further equipped with a windshield and windshield washer means operable to periodically dispense liquid under the windshield, which is washed with the windshield wipers. The windshield washer means has a tank or reservoir located adjacent the engine for accommodating a windshield cleaning liquid. The windshield cleaning liquid contains a mixture of water and alcohol. Other types of cleaning liquids, including water and pure alcohol, can be used as a windshield cleaning liquid. The apparatus of the invention has a first tubular member mounted on the cap for the windshield liquid reservoir. The first tubular member accommodates an elongated tube that extends to adjacent the bottom of the reservoir. The outer end of the tube is open to the atmosphere whereby air can flow through the tube into the reservoir. A valve assembly, including T-connector means, is interposed in the hose connecting the PVC valve and the intake manifold. A valve means mounted on the T-connector means controls the flow of air and vapors through the T-connector means thereby controlling the flow of air and vapors into the intake of the engine. The valve means is adjustably mounted on the T-connector whereby the flow of air and vapors can be regulated.

In the preferred embodiment of the invention, the tubular member is a right angled tubular fitting having a downwardly directed tubular section extended through a hole in the cap means of the reservoir. The first section has a shoulder that engages with the top of the cap. A nut threaded onto the first section clamps the shoulder onto the cap. An elongated flexible tube passes through a hole in the tubular member and the passage of the first section. The lower end of the tube is located adjacent the bottom of the reservoir below the level of the liquid stored in the reservoir. A valve assembly controls the flow of air and vapor to the intake means of the engine. The valve assembly includes a right angled T-connector having a first section with opposite ends coupled to the hose joined to the PVC valve and the carburetor. A valving means comprising an elongated stem threadably mounted on the T-connector extends through the body section of the T-connection. A cone-shaped head is secured to the end of the stem. The cone-shaped head is located adjacent the end of the body section and forms therewith an annular throat through which air and vapors flow into the T-connector. Rotation of the stem longitudinally adjusts the head relative to the end of the body and thereby regulates the size of the annular throat between the head and the end of the body.

The invention includes a valve assembly for controlling the flow of fluid, such as air, liquids, and the like. The valve assembly has a first tubular means provided with a first passage for carrying a fluid and a second tubular means having a second passage for carrying a fluid. The second passage is open to the first passage. A valve means mounted on the first tubular means extends into the second passage. The valve means has head means cooperating with the portion of the second tubular means to restrict the flow of fluid into the second passage. The valve means in a preferred embodiment of the invention comprises an elongated stem threadably mounted on the first tubular means and extended longitudinally into the second passage. The stem terminates in a cone-shaped head located adjacent the circular end of the second tubular means. The stem, on rotation, longitudinally moves the cone-shaped head relative to the circular end of the second tubular means and thereby controls the annular throat between the circular end and the cone-shaped head to regulate the flow of fluid into the second passage.

The apparatus of the invention is a simple and inexpensive structure that is easily installed onto the existing blow by gas hose and cap of a windshield washer liquid reservoir. The apparatus has an adjustable valve allowing the engine to be effectively and efficiently tuned to effectively utilize the vapors and air drawn through the reservoir containing the windshield washer cleaning liquid. The reservoir may include a liquid that is particularly suitable for the operation of the engine, such as methanol.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

FIG. 3 is an enlarged sectional view taken along line 3—3 of FIG. 2;

FIG. 4 is an enlarged sectional view taken along line 4—4 of FIG. 2;

FIG. 5 is an enlarged sectional view along the line 5—5 of FIG. 2, and

FIG. 6 is a fragmentary sectional view showing adjustment of the vapor injection system.

DESCRIPTION OF THE PREFERRED EMBODIMENT

Figure 1:
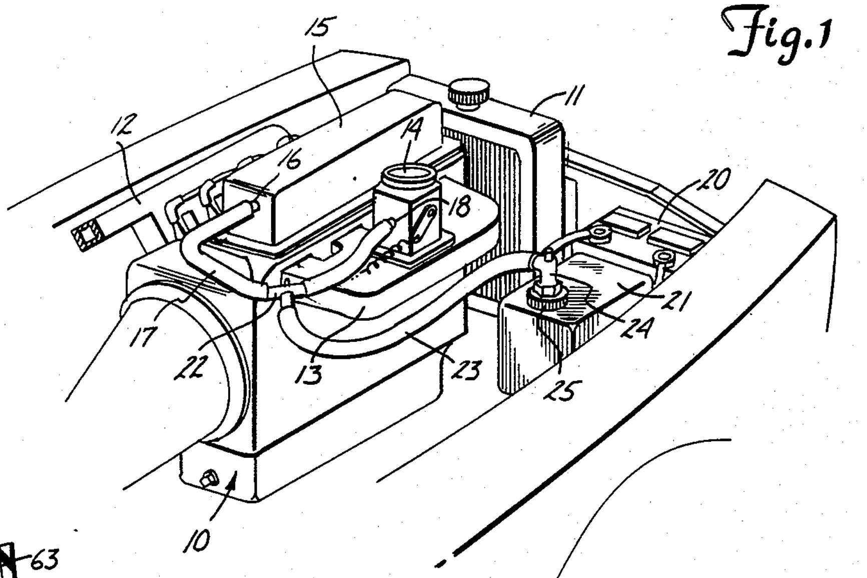
FIG. 1 is a general perspective view of an automobile internal combustion engine equipped with the vapor injection system of the invention.

Referring to FIG. 1, the invention is shown in association with an internal combustion engine 10 having a coolant radiator 11, an exhaust manifold 12, an intake manifold 13, and a carburetor 14. A valve cover 15 having a crankcase ventillation valve 16 encloses the engine valves and rocker arms. Valve 16 is the conventional PVC valve. Valve 16 can be mounted on the cap of an oil filler as shown in U.S. Pat. No. 3,990,489. Hose 17 connects valve 16 to a fitting 18 on carburetor 14. Fitting 18 has a passage open to the passage of the carburetor 14 whereby the vacuum pressure in the carburetor draws air and blow by gas from the inside of cover 15 through valve 16 and hose 17 into carburetor 14. Fitting 18 can be connected to intake manifold 13 whereby the vacuum pressure of the gas in manifold draws air and gas from the inside of cover 15. Also shown are a battery 20 and a container 21 for windshield washer fluid, which is drawn from the bottom of the container with a conventional motor driven pump. The washer fluid is discharged through nozzles (not shown) onto the windshield on operation of the pump.

A first conductor T-fitting, indicated generally at 22, is installed in hose 17 and connected by a second hose 23 to a second conductor fitting 24 installed in cap 25 of container 21. Fittings 22 and 24 and hose 23 provide a passage for carrying air and vapors from container 21 to hose 17. Hose 17 delivers this air and vapors to carburetor 14.

Figure 2:
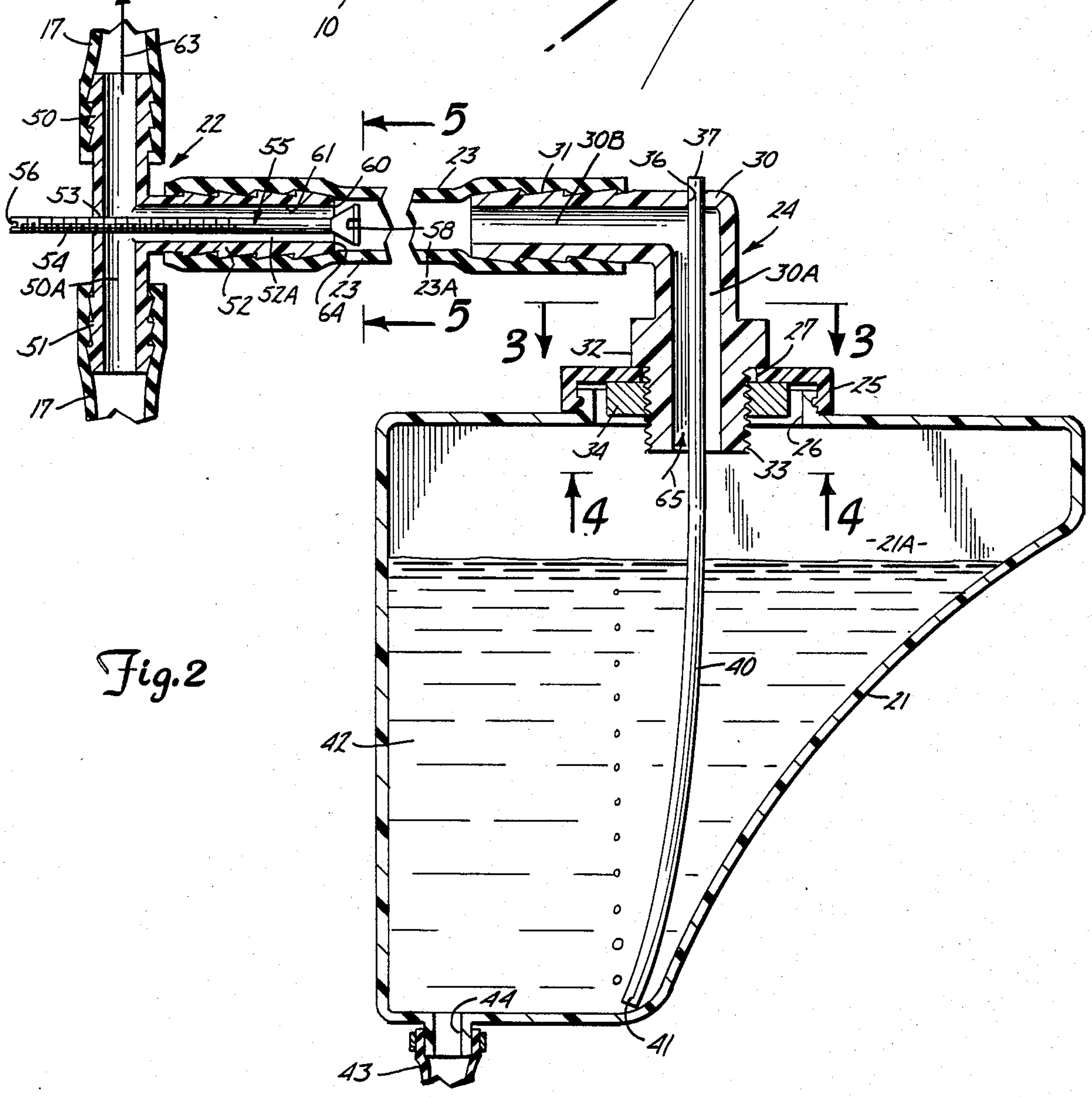
FIG. 2 is a fragmentary sectional view of the vapor injection system.

FIG. 2 shows cap 25 snapped over a short upright neck 26 surrounding a filler opening in the top wall of container 21. Cap 25 has a center hole or aperture 27 to receive fitting 24. Fitting 24 is an angle tube 30 having one end formed with serrations 31 to securely receive one end of hose 23. The other end of angle tube 30 has a hexagonal shoulder 32, beyond which it has threaded portion 33 to receive a lock nut 34 by which the fitting is secured into cap 25. Threaded portion 33 extends through hole 27 in cap 25. Shoulder 32 bears against the top of cap 25 and nut 34 engages the bottom of cap 25 thereby firmly clamping fitting 24 on cap 25. Shoulder 32 and nut 34 are larger in diameter than hole 27 so that hole 27 is sealed or closed when shoulder 32 and nut 34 are clamped onto cap 25. The wall of tube 30 adjacent the right angle bend therein has an aperture 36 into which there is mounted one open end 37 of a small tube 40. Tube 40 is an elongated flexible tubular member having an unobstructed passage. Tube 40 extends through passage 30A downwardly into chamber 21A of container 21. The diameter of tube 40 is substantially less than the diameter of passage 30A so that the tube 40 does not interfere with the flow of air and vapors through passages 30A and 30B of fitting 30. Tube 40 is forced through hole 36 thereby compressing an annular section of the tube located in hole 36. The bottom open end 41 of tube 40 extends substantially to the bottom of container chamber 21A, well below the surface of liquid 42 contained therein. A hose 43 for conducting liquid 42 to the windshield washer pump is connected to a nipple 44 at the bottom of container 21. Some windshield washers have containers and motor driven pumps mounted directly in the bottom of the container. The vapor injection apparatus of this invention is useable with this type of windshield washer.

Fitting 22 is a T-fitting, having a cross section with opposite ends 50 and 51 serrated for securely receiving adjacent sections of hose 17, and a body or branch section 52 serrated for securely receiving the end of hose 23 remote from fitting 24. An opening 53 is formed in the wall of fitting 22, and is tapped or threaded to receive the threaded shank 54 of an adjusting member 55. Member 55 is an elongated rod extended along the longitudinal axis of passage 52A extended through body section 52. The diameter of the part of member 55 located in passage 52A is substantially smaller than the diameter of passage 52A so as to allow air and vapor to freely flow through passage 52A into passage 50A. Passage 50A is in direct communication with the passage of hose 17. A screw driver slot 56 is located in the end of member 55 outside the fitting 22 for receiving a screw driver indicated at 57 in FIG. 6.

As shown in FIGS. 2 and 6, member 55 extends through passage 52A of branch 52. The inner end of member 55 has a tapered or cone-shaped head 58 located adjacent to end 60 of fitting 22. Head 58 has a diameter at its large end that is greater than the diameter of bore 61 of branch 52. Head 58 has a smooth annular conical outside surface that tapers outwardly from the inner end of the rod. As shown in FIG. 5, the large end of head 58 has a diameter smaller than the inside diameter of passage 25A of hose 23 to allow air and vapors to flow past head 58 into passage 52A. Head 58 is longitudinally adjustable relative to end 60 to restrict the flow of air and vapors into passage 52A. Head 58 forms with end 60 an annular venturi throat 64. The size of the venturi throat 64 is adjustable to regulate the introduction of air and vapor to carburetor 14. Member 55 may conveniently be a commercially available flat-headed machine screw of appropriate dimensions. If desired, end 60 of fitting 21 may be machined to a slight internal curvature or conical taper 62 similar to the taper of head 58.

To install fitting 22, hose 17 is cut and fitting 22 is installed between the cut ends, cap 25 is removed and apertured to pass fitting 24, which is inserted and fastened by nut 34, after which cap 25 is replaced. When fittings 22 and 24 are inter-connected by hose 23, the system installation is complete.

OPERATION

The operation of the system is as follows. Container 21 is supplied with liquid, which may comprise water alone or may include an additive containing alcohol, such as methanol. Container 21 can store pure alcohol. Member 55 is adjusted so that head 58 closes end 60 of fitting 22. The engine is started, creating an air flow through fitting 22 in the direction of the arrow 63, negative or vacuum intake pressure being maintained at fitting 18 by operation of the engine. Now when member 55 is adjusted, as shown in FIG. 6, to open throat 64 between head 58 and bore 61, air is drawn from above liquid 42, as indicated by arrow 65, the air being replaced through tube 40 and bubbling up through liquid 42, so that air bearing the vapor of the liquid or liquids in the container is supplied to manifold 13 through fitting 24, hose 23, fitting 22, hose 17, and fitting 18. In one embodiment of the invention, shank 54 had 24 threads per inch, and one turn of member 55 was sufficient to admit the desired amount of vapor from the container to the engine.

It will be evident that the invention can cause no interference with the normal supply of liquid to the windshield wipers, or with the addition of liquid to container 21, as necessary. If the additive which is used is more volatile than water, it may be necessary to renew the additive slightly more frequently.

From the above, it will be evident that the invention comprises a simple, economical, easily installed system for drawing air through a selected liquid in a container and supplying it in desired proportion to the intake of an engine.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or privilege is claimed are defined as follows:

1. In combination: a first fitting having a wall comprising first and second conduits having axes intersecting at generally a right angle, and a tube co-axial with said first conduit and passing in sealed relation through a hole in the wall of said fitting; a second fitting comprising a first conduit having a wall and a first axis, a branch conduit having a second axis and intersecting said first conduit so that axes are generally perpendicular, a first valving surface at the outer end of said branch conduit, a valving member including means having a second valving surface movable relative to said first valving surface for controlling the flow of fluid through the branch conduit, and a stem joined to the means having the second valving surface, said stem extending through said branch conduit and threaded through the wall of said first conduit, and means outside said first fitting on the stem usable to rotate the stem to adjust the position of said valving member to change the distance between said first and second valving surfaces and maintain said changed distance thereby controlling the flow of fluid through the branch conduit and; tubular means connecting said second conduit of said first fitting with said branch conduit of said second fitting.

2. The structure of claim 1 wherein: the tubular means is an elongated flexible tube.

3. The structure of claim 1 wherein:

the first valving surface is circular and said second valving surface is generally cone-shaped and concentric with respect to the first valving surface.

4. The structure of claim 1 wherein:

said stem has threads cooperating with said wall of the first conduit whereby rotation of the stem moves the second valving surface relative to the first valving surface.

5. A valve assembly comprising: a first conduit having a wall and a first axis, a branch conduit having a second axis and intersecting said first conduit so that said axes are generally perpendicular; a first valving surface at the outer end of said branch conduit; a valve member including a head having a second valving surface movable relative to said first valving surface for controlling the flow of fluid through the branch conduit, and a stem joined to the head, said stem extending through said branch conduit, said stem having threads cooperating with the wall of said first conduit; and means on the stem outside of the first conduit useable to rotate the stem to change the distance between said first and second valving surfaces and maintain said changed distance thereby controlling the flow of fluid through the branch conduit into the first conduit.

6. The valve assembly of claim 5 wherein:

the first valving surface is circular and said second valving surface is generally cone-shaped and concentric with respect to the first valving surface.

* * * * *